Figure 1:
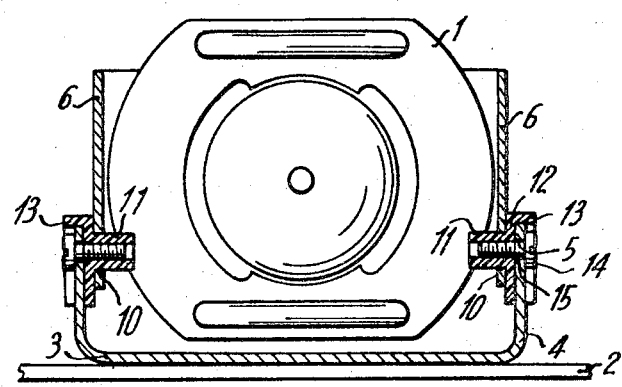

United States Patent

[11] 3,553,506

| [72] | Inventor | Marcel Fresard, Petit-Lancy, Geneva, Switzerland |
|---|---|---|
| [21] | Appl. No. | 772,201 |
| [22] | Filed | Oct. 31, 1968 |
| [45] | Patented | Jan. 5, 1971 |
| [73] | Assignee | Mefina S. A. Fribourg, Switzerland a company of Switzerland |
| [32] | Priority | Nov. 28, 1967 |
| [33] | | Switzerland |
| [31] | | No. 16701/67 |

[54] MOUNT FOR PIVOTALLY SUPPORTING AN ELECTRIC MOTOR
9 Claims, 2 Drawing Figs.

[52] U.S. Cl. .................................................... 310/91, 310/51
[51] Int. Cl. .................................................... H02k 5/00
[50] Field of Search .................................................... 310/91, 89, 51; 248/(Inquired); 85/82

[56] References Cited
UNITED STATES PATENTS

| 1,778,992 | 10/1930 | Wulfert | 310/51 |
| 2,440,897 | 5/1948 | Hammarstrom | 310/91 |
| 2,475,302 | 7/1949 | Adams | 310/51 |
| 2,928,632 | 3/1960 | Morrill | 310/51 |
| 2,982,504 | 5/1961 | Feiertag | 310/51 |
| 3,114,060 | 12/1963 | Goettl | 310/91 |

OTHER REFERENCES
German Pre-Publication 01015525; 9-1957; INV. Preus; 310/91

Primary Examiner—Milton O. Hirshfield
Assistant Examiner—R. Skudy
Attorney—Waters, Roditi, Schwartz & Nissen ABSTRACT: Two internally threaded electrically insulating sleeves are mounted in respective holes in the motor housing. Screws, passing through respective holes in respective feet of a bracket rigid with the sewing machine casing, are threaded into a respective sleeve. Each sleeve includes a flange and lip to ensure electrical insulation between the housing and bracket and to prevent the sleeve from turning with the motor as the latter is swung about the axle composed of the screws and sleeves.

MOUNT FOR PIVOTALLY SUPPORTING AN ELECTRIC MOTOR

The invention relates to a mount for pivotally supporting an electric motor.

It is often necessary to mount an electric motor free to swing between two or more positions. In certain sewing machines, for example, the motor is pivotally mounted to turn between one position, in which the motor drive wheel turns the sewing machine flywheel, and another position, in which the drive wheel turns the bobbin spindle. These mounts tend to become rather complicated in design and costly to manufacture, particularly when the motor is to be electrically insulated from the sewing machine casing.

An object of the invention is to provide a mount for pivotally supporting an electric motor, which mount is simple and inexpensive, but nevertheless provides complete electrical insulation between the motor housing and the mount.

According to the invention there is provided a mount having an axle about which the motor is free to swing, the axle including at least one screw means and an electrically insulating sleeve for receiving and securely holding the screw means, the sleeve being mounted in a hole in the motor housing, and a support means fixed to the casing for carrying the screw means.

The above object and other objects of the invention will be apparent from the ensuing detailed description.

Figure 2:
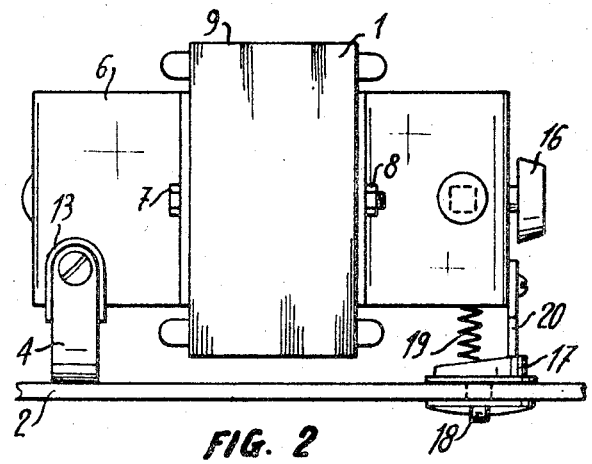

The invention will be described, with reference to the appended drawings, wherein:

FIG. 1 is a side view, in section, of the mount of the invention, the motor being shown end-on; and FIG. 2 is an end view of the bracket, the motor being shown in side view.

With reference to the drawing, the mount holds an electric motor 1 free to turn with respect to a casing 2. The latter, for example, can be the casing of a sewing machine, which is driven by the motor 1. A bracket 3 incorporating 2 feet 4 having each a hole 5 is fixed on the casing 2. The motor 1 includes a housing 6 comprised, in the embodiment illustrated, of sheet metal bent to shape and fixed to the motor's stack of laminations 9 by bolts 7 and nuts 8. The sheet metal of the housing 6 is provided with two holes 10 of sufficient diameter to permit the insertion of a respective electrically insulating sleeve 11 made of a suitable synthetic plastic. Each sleeve 11 incorporates an integral flange 12 that is positioned between a respective bracket foot 4 and the motor housing 6. Each flange 12 embodies a lip 13 that surmounts or hugs the edge of the respective foot 4, to ensure that the motor housing 6 is electrically insulated from the casing 2, and to prevent the sleeve 11 from rotating when the motor is turned.

Each sleeve is internally threaded for receiving a screw 14 having a load bearing surface 15, the cross section of which fills the hole 5 of the respective bracket foot 4. The presence of a screw 14 in each sleeve 11 ensures that all shearing forces between the housing 6 and the axle about which it turns, formed by the screws 14 and the sleeves 11, are largely borne by the screws.

The mount described is extremely simple, but nevertheless ensures that the housing 6 is completely electrically insulated from the casing 2 and the bracket 3.

In a variation of this embodiment, one of the screws 14 can be replaced by a simple rivet that is rigid with one of the bracket feet 4, the remaining screw 14 in the other foot 4 permitting the electric motor to be removed from, and remounted in, the bracket 3.

The motor mount permits the motor to swing with respect to the casing 2, so that the motor drive wheel 16 can be placed into contact with the sewing machine flywheel or the bobbin spindle, the motor being turned by a cam 17 rotated by a knob 18. A tension spring 19 holds a cam follower 20, rigidly connected to the motor housing 6, in contact with the cam 17. The spring is secured to the housing 6 through an electrically insulating grommet. The cam follower 20 is advantageously made of an electrically insulating material.

Although a preferred embodiment of the invention has been described, the scope of, and the breadth of protection afforded to, the invention are limited solely by the appended claims.

Notwithstanding that the mount of the invention has been described with particular reference to its application in a sewing machine, it will be understood by those skilled in the art that it can be advantageously employed in many other instances; and the appended claims are to be so interpreted.

I claim:

1. A mount for pivotably supporting an electric motor with respect to a casing, said mount comprising a pair of feet secured to said casing, the motor having a housing with openings facing said feet, each foot having an outer peripheral edge, sleeves of electrically insulating material engaged in respective openings of said housing to permit rotation of the housing on said sleeves, each sleeve including an integral flange interposed between said housing and a respective foot, and an integral lip on said flange surmounting the outer peripheral edge of said respective foot such that the flange and lip cover the surfaces of the foot adjacent the housing to ensure electrical insulation between said motor housing and said foot while the engagement of the lip on the outer edge of the foot prevents rotation of the sleeve when the motor is rotated thereon, and a fastener in each sleeve supported by the associated foot.

2. A mount as claimed in claim 1 wherein at least one of said fasteners is a screw threadably engaged in its respective sleeve.

3. A mount as claimed in claim 2 comprising a bracket secured to said casing, said feet being integral with said bracket.

4. A mount as claimed in claim 3 wherein each foot has a hole in which the associated fastener is supported.

5. A mount as claimed in claim 4 wherein said feet are upstanding from said casing.

6. A mount as claimed in claim 5 wherein each sleeve has opposite ends, said flange thereof being at one of said ends.

7. A mount as claimed in claim 1 comprising means coupled to said casing and said housing for pivoting the motor on said sleeves.

8. A mount as claimed in claim 1 wherein said lip on each flange conforms to the shape of the outer peripheral edge of the associated foot thereby to surmount the same.

9. A mount as claimed in claim 1 wherein said housing has opposite ends, said feet and sleeves being at one end of the housing to pivotably support the same thereat, and means spaced from said one end and coupled to said casing and housing for pivoting the motor about said sleeves.